United States Patent
Rosenkranz et al.

(10) Patent No.: US 8,977,562 B2
(45) Date of Patent: Mar. 10, 2015

(54) SYSTEM AND METHOD FOR DETECTING DIGITAL MEDIA STATUS IN A SORTER

(75) Inventors: Thomas H. Rosenkranz, Dover Plains, NY (US); John P. Thorpe, Lafayette, IN (US); Daniel P. Scott, West Lafayette, IN (US)

(73) Assignee: Pitney Bowes Inc., Danbury, CT (US)

( * ) Notice: Subject to any disclaimer, the term of this patent is extended or adjusted under 35 U.S.C. 154(b) by 2571 days.

(21) Appl. No.: 11/588,684

(22) Filed: Oct. 27, 2006

(65) Prior Publication Data
US 2008/0120202 A1  May 22, 2008

(51) Int. Cl.
*G06Q 10/00* (2012.01)
*B65D 85/30* (2006.01)
*B07C 5/34* (2006.01)
*G06Q 10/08* (2012.01)
*G11B 33/04* (2006.01)
*G11B 33/06* (2006.01)

(52) U.S. Cl.
CPC ............ *B07C 5/3412* (2013.01); *G06Q 10/087* (2013.01); *G11B 33/0427* (2013.01); *G11B 33/06* (2013.01)
USPC ......................................... 705/28; 206/308.1

(58) Field of Classification Search
USPC ............................................ 705/1; 206/308.1
See application file for complete search history.

(56) References Cited

U.S. PATENT DOCUMENTS

| 4,997,076 A | 3/1991 | Hirschfeld et al. | |
| 7,568,613 B1 * | 8/2009 | Dillon et al. | 229/305 |
| 2002/0104767 A1 | 8/2002 | Lux, Jr. et al. | |
| 2006/0049069 A1 * | 3/2006 | Perrone et al. | 206/308.1 |
| 2006/0175389 A1 | 8/2006 | Dahlquist | |
| 2006/0212304 A1 * | 9/2006 | Krause | 705/1 |
| 2006/0219782 A1 * | 10/2006 | Wong et al. | 235/385 |

FOREIGN PATENT DOCUMENTS

| EP | 1081640 A2 | 3/2001 |
| WO | WO-00/55859 A1 | 9/2000 |

* cited by examiner

*Primary Examiner* — Ryan Zeender
*Assistant Examiner* — Denisse Ortiz Roman
(74) *Attorney, Agent, or Firm* — Steven J. Shapiro; Charles R. Malandra, Jr.

(57) ABSTRACT

The present invention provides for automation of the process of ensuring that the contents of the return mailed digital media, comprising a disc enclosed in a sleeve, is correct for redistribution. A camera on a sorting machine is used to scan a first code on a hub of the disc through a sleeve opening. The camera also scans a second code printed on the sleeve. The sorter computer compares the first and second codes to determine whether the first and second codes correspond. If the first and second codes do not correspond, the sorter outsorts the mailed digital media so that the mismatch problem can be corrected. In a further embodiment, the system detects whether there are more or less than a single disk in the mail package. In the preferred embodiment, the mailed digital media is further composed of an envelope that receives and encloses the sleeve. The sorter scanner scans first code is further comprised of scanning the first code through an envelope opening, preferably the same envelope opening used for scanning of the first code.

15 Claims, 14 Drawing Sheets

SYSTEM AND METHOD FOR DETECTING DIGITAL MEDIA STATUS IN A SORTER

TECHNICAL FIELD

The present invention relates to a digital media disk enclosure for facilitating processing, distributing, and redistributing digital media disks by mail.

BACKGROUND OF THE INVENTION

The development of the Digital Versatile Disc ("DVD") as a medium for carrying digital movie and video information has led to a new rental business models that use postal mail for media transport. For example, U.S. Pat. No. 6,584,450, Method and Apparatus for Renting items, describes a DVD rental service in which a subscriber establishes an online "pick list" of DVD movies that the subscriber wishes to rent. In addition to DVD's such a service may be used to provide video game disks, CD's, CD-ROM's, or any other optical media. When a selected one of the DVD movies on the pick list becomes available in inventory, the service mails the selected DVD movie to the subscriber. The subscriber views the DVD and returns it to the service by mail. When the DVD is received by the service, the subscriber is entitled to receive another available DVD from the pick list.

In the conventional service, much of the work in receiving returned DVD's and sending out new DVD's to customers is done manually. For example, an envelope containing a returned DVD is opened by hand by workers employed by the service. The worker manually scans a code on the DVD packaging to identify the returned DVD and the customer. Some of the returned DVD's will be returned to inventory, however many of the returned DVD's will need to be sent to other customers. The returned DVD's are then manually processed again to determine which are need to be resent to customers, and which should be kept for internal storage or processing. Finally, outgoing DVD's are manually inserted into conventional mailers to be placed for outgoing delivery with the postal or delivery service. To maintain customer satisfaction, rapid processing of these incoming and outgoing DVD's is critical. The extensive manual processing of returned and outgoing DVD's can be time that makes quick and reliable turn-around more difficult.

SUMMARY OF THE INVENTION

The present invention overcomes disadvantage of the conventional methods and systems by providing a digital media mail package that can be efficiently processed in an automated fashion.

It is desirable that the service be able to quickly determine whether a returned DVD is in condition for immediate redistribution. One determination is whether the DVD is in the appropriate protective sleeve. The sleeve encloses the DVD for placement in the delivery and return envelope. The sleeve also includes information specific to the particular DVD, such as the title, and other information about the DVD contents.

It is reasonable to assume that subscribers may not always place the returned DVD in the correct sleeve. Accordingly, redistribution based solely on information on the sleeve could result incorrect DVD's being delivered. For this reason, it is known in the prior art to perform a manual inspection to determine that the DVD matches the sleeve in which it is enclosed.

The present invention provides for automation of the process of ensuring that the contents of the return mailed digital media is correct for redistribution. The system and method are applicable to mailed digital media comprising a disc enclosed in a sleeve. A camera on a sorting machine is used to scan a first code on a hub of the disc through a sleeve opening. The camera also scans a second code printed on the sleeve. The sorter computer compares the first and second codes to determine whether the first and second codes correspond, i.e. to determine whether the correct disc is in the correct sleeve.

If the first and second codes do not correspond, the sorter outsorts the mailed digital media so that the mismatch problem can be corrected. Such correction might typically be through a manual process.

In a further embodiment, the system detects whether there are more or less than a single disk in the mail package. One technique comprises including scanning a third code on an opposite side of the disc hub through the sleeve opening. The third code is then compared to the first and second codes to determine if the codes on both sides belong to the same DVD. If they are different, then it is known that there is more than one DVD in the sleeve. If no first or third barcode is detected, then it will be known that there is no disc in the sleeve.

In another embodiment, a thickness sensor is used to determine whether the thickness of the mailed digital media package is too much or too little for a single disc. If it is too much, then it may be inferred that there is more than one disc. If there is too little thickness, then it means that there is no disc in the sleeve.

In the preferred embodiment, the mailed digital media is further composed of an envelope that receives and encloses the sleeve. The sorter scanner scans first code is further comprised of scanning the first code through an envelope opening, preferably the same envelope opening used for scanning of the first code.

In one embodiment, at least one surface of the sleeve is printed with a plurality of identification markings on at least one of the sleeve's outer surfaces. The identification markings are each positioned at a first radial distance from a center of the sleeve in regularly angled intervals around the center.

The envelope includes a pocket into which the sleeve fits. There is an opening in the located at substantially the first radial distance from the planar center of the sleeve pocket. The opening is also positioned at a same angle as the identification markings, such that any of the identification markings will show through the opening when the sleeve is placed in the sleeve pocket in any of its possible orientations. This provides automated scanning capability that does not depend on the user placing the sleeve in the envelope in any single orientation.

The envelope may also include an unplayable indicator mark made by the subscriber/sender on the envelope. If an unplayable indicator mark is detected then the disc is identified as requiring correction processing, and the sorter outsorts it for further processing.

Further details of the present invention are provided in the accompanying drawings, detailed description, and claims.

DETAILED DESCRIPTION

The preferred embodiment of the digital media mailer shown in FIGS. 1-4 is composed of three sheets fastened on top of one another in three layers. While the preferred embodiment uses separate and distinct sheets for its layers, the term "sheets" should also be understood to mean parts of a single sheet that have been folded to form the layers that comprise the mailer.

In this application, certain elements of the two-way mailer may be relevant for different stages in the use of the mailer. These stages will be referred to as "initial" or "outgoing" stage for the delivery of the media from the service to the customer. A "return" or "incoming" stage refers to the part of the process when the customer is returning the digital media to the service. Certain features are directed to assisting to quickly transition a DVD from an incoming stage from one customer, to an outgoing stage for another customer.

Figure 1A:
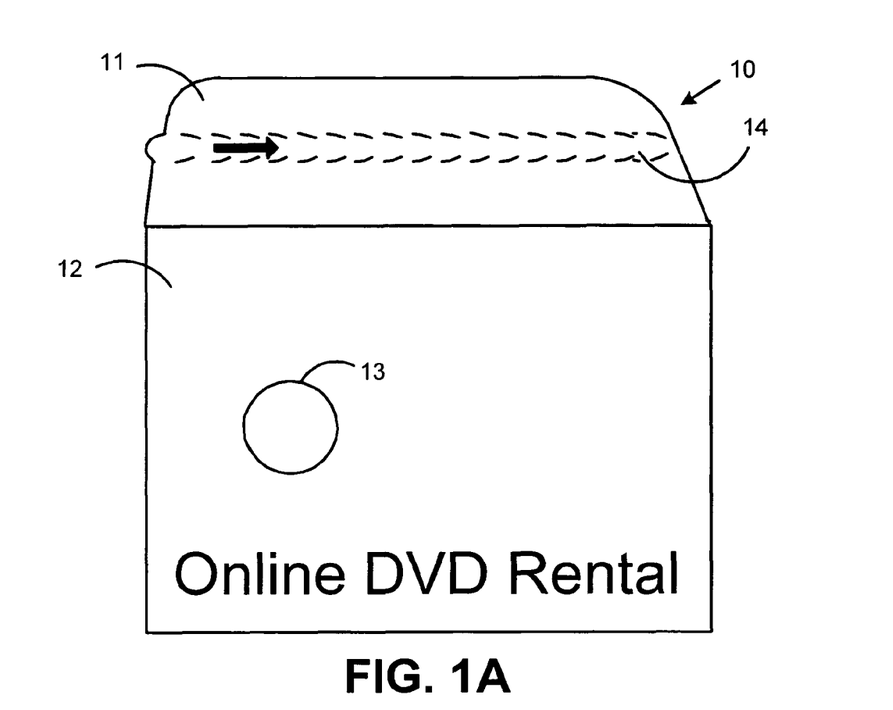
FIGS. 1A and 1B depict an exemplary back sheet for forming a two-way mailer.
Figure 1B:
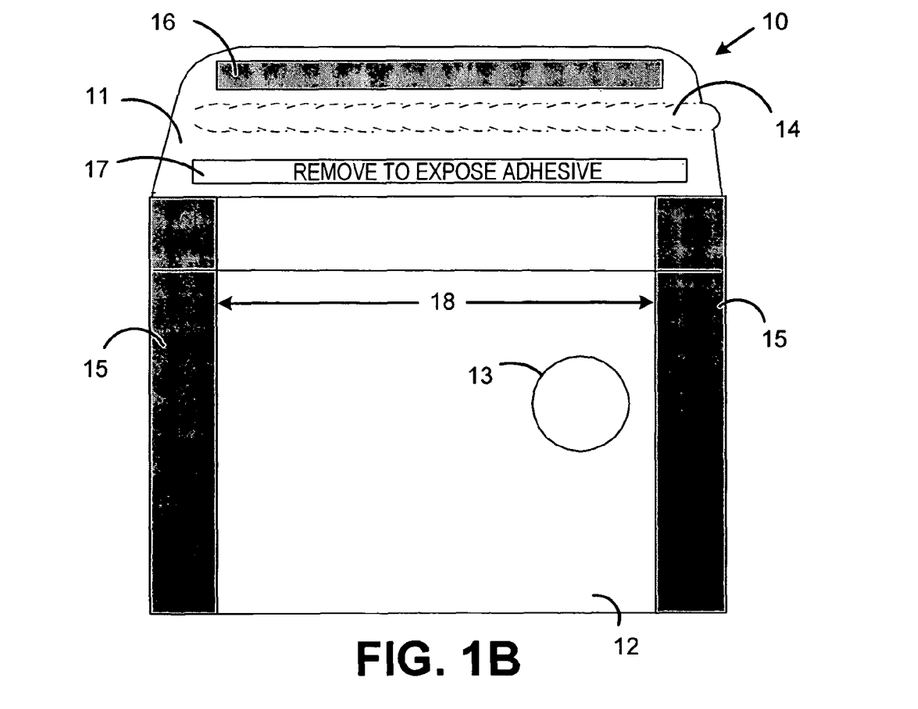

FIGS. 1A and 1B depict a back sheet 10 that forms a base for constructing the two-way mailer. FIG. 1A shows a rear view of the back sheet 10. The back surface shown in FIG. 1A will be the back side of the envelope for both the outgoing and return mail pieces. FIG. 1B is the interior side of back sheet 10. This interior side will form part of the pocket for holding the digital media.

Back sheet 10 includes the flap 11 used for sealing the mailer. On flap 11 adhesive 16 is used to seal the flap closed upon outgoing delivery. Perforated strip 14 is torn by the digital media recipient in order to open the sealed flap 11 to remove the digital media. For resealing, a covered adhesive 17 is provided. When the recipient wishes to reseal and return the mailer, a non-adhesive covering is removed from adhesive 17 and the flap 11 may be sealed again (with the upper portion of flap 11 gone from the prior opening process).

The body 12 of back sheet 10 includes a circular opening 13. Opening 13 is a hole in the sheet positioned to be a predetermined distance from the center of the pocket region in which the digital media will be placed during outgoing and return delivery. The predetermined distance and angular positioning of the opening 13 will be discussed later in connection with FIGS. 5A and 5B. Opening 13 provides viewing access to a digital media sleeve 50 from the rear side of the envelope for both outgoing and return mail pieces. A circular shaped opening is preferred because that shape is less likely to catch in postal processing equipment. However, any alternative shape may suffice.

Adhesive regions 15 along the left and right sides of back sheet body 12 are used to attach the middle sheet 20 (FIG. 2) to the back sheet 10. In between the adhesive regions 15, a pocket region 18 will be formed for holding the digital media. Accordingly, it will be important to carefully dimension the adhesive regions 15 to achieve the desired pocket region. It will be understood that the glue regions 15 may be correspondingly placed on middle sheet 20, and still have the same structural result.

Preferred dimensions for the back sheet 10 are as follows: back sheet body 12 is 7.5"×5.5"; flap 11 extends 2" from body 12; and opening 13 is 1.2" in diameter. The adhesive regions 15 are 1" wide, and the pocket region is 5.75" inches wide.

Figure 2:
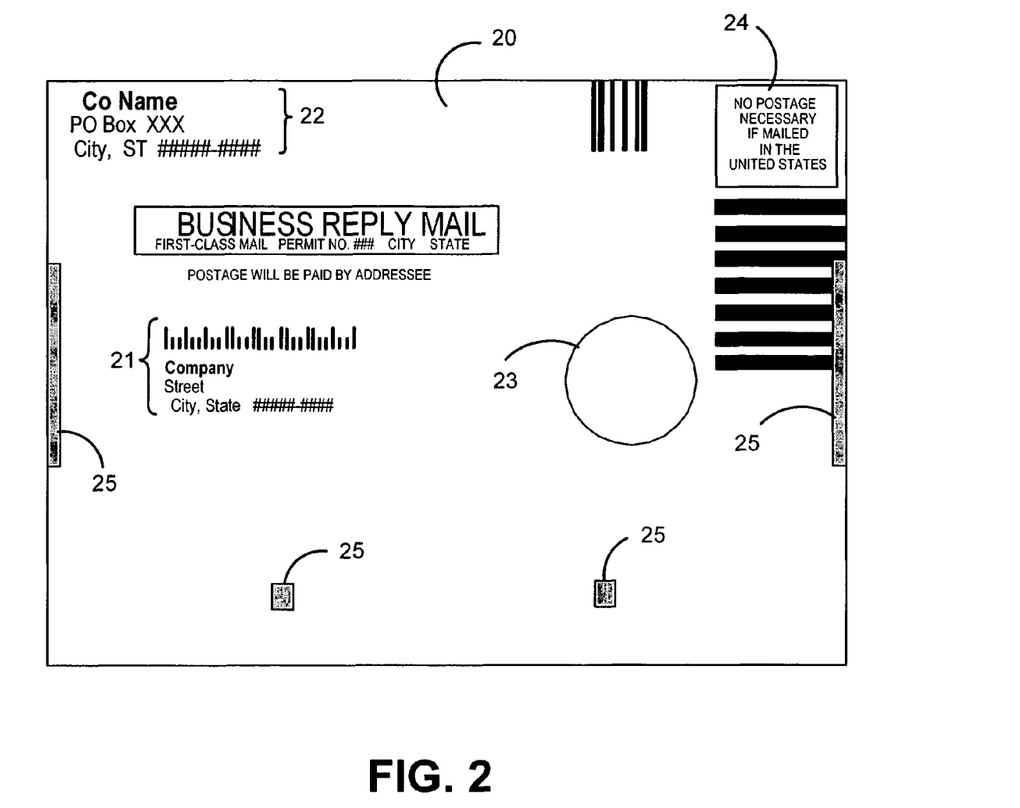
FIG. 2 depicts an exemplary middle sheet for forming a two-way mailer.
Figure 3:
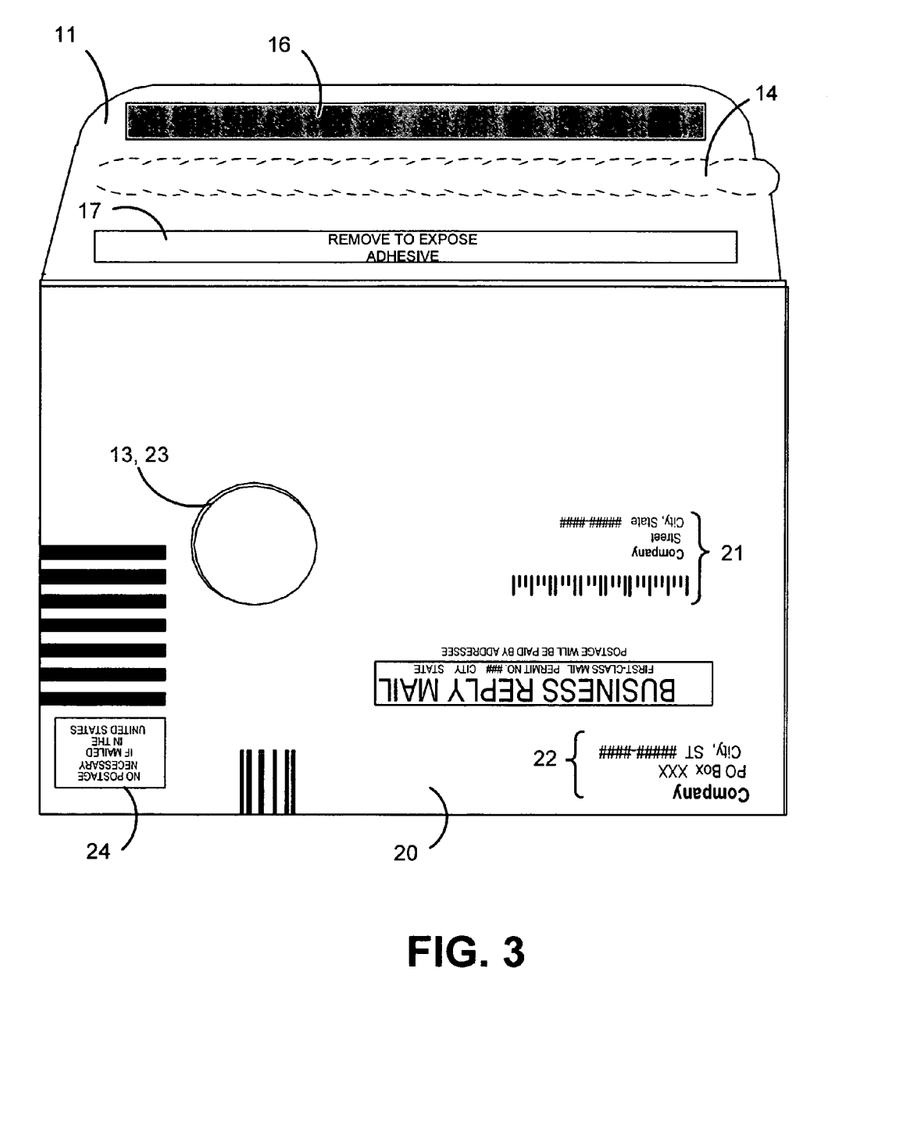
FIG. 3 depicts the combination of the exemplary back and middle sheets for forming a two-way mailer.

Middle sheet 20, depicted in FIG. 2, fits directly over the body 12 of back sheet 10, and has the same measurements. In a preferred embodiment the middle sheet 20 is placed upside down on the back sheet 10, so that when the flap 11 eventually closes it will not cover the return address 22 or postal markings 24. This combination of the back sheet 10 and middle sheet 20 is depicted in FIG. 3.

Middle sheet 20 also includes a return destination address 21, indicating where the digital media will be delivered upon return from the customer. In a first embodiment, the return destination address 21 is preprinted on middle sheet 20 prior to assembly in the mailer. Alternatively, for use in an embodiment such as depicted in FIGS. 7 and 8A-D, the return destination address 21 may initially be blank. Middle sheet opening 23 is the same size, and aligns with, back sheet opening 13. When middle sheet 20 is fastened on top of back sheet 10 a pocket region 18 is formed, and through openings 13 and 23 the contents of pocket region 18 may be viewed both from the front and back.

Figure 4:
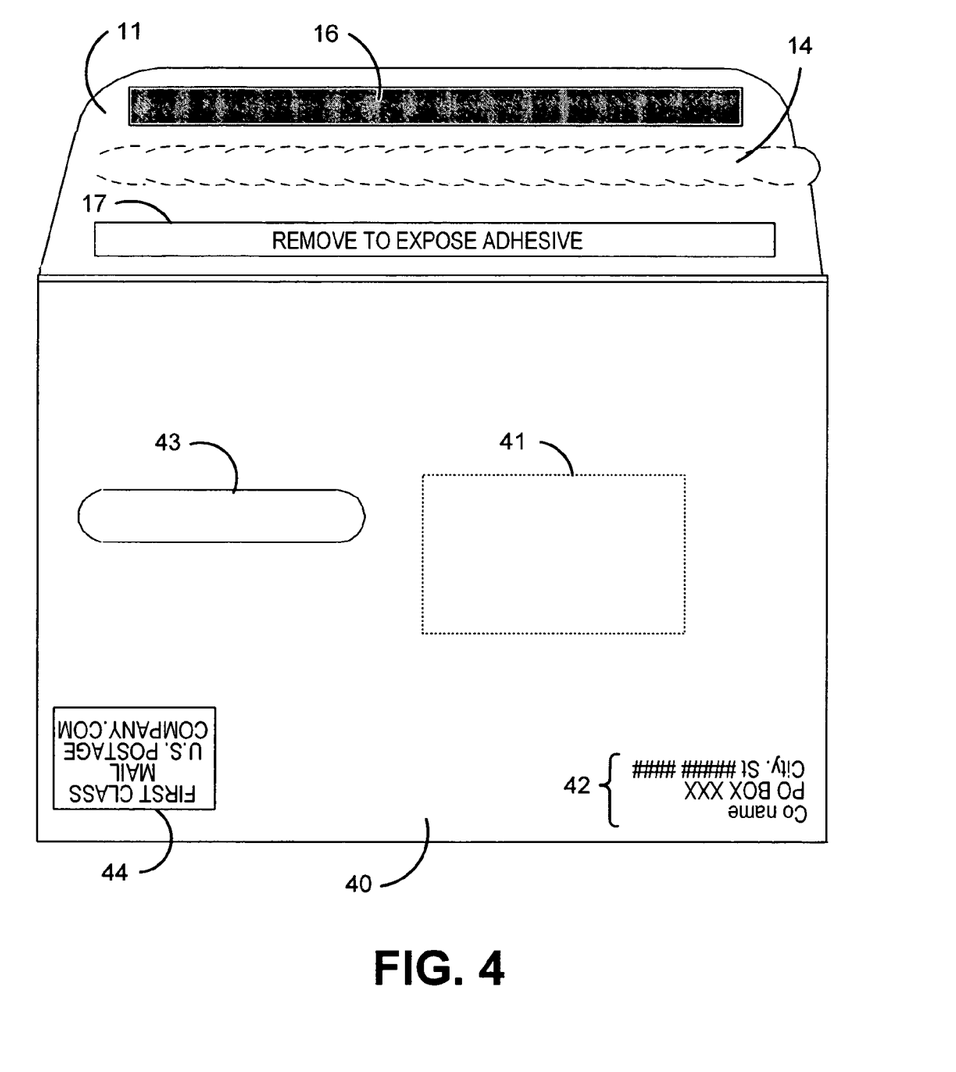
FIG. 4 depicts the combination of FIG. 3 with the addition of a removable top sheet.

For attaching a top sheet 40 to the middle sheet 20, adhesive areas 25 are placed on the middle sheet 20. Adhesive areas 25 are preferably small as compared to adhesive regions 15. The reason for small adhesive areas 25 is so that a user will be able to easily remove the top sheet 40 when it is time to use the return portion of the mailer. Accordingly, a plurality of small adhesive areas 25 is preferred, as opposed to fewer and larger areas.

FIG. 4 depicts a top sheet 40 fastened on top of the middle sheet 20. In the preferred embodiment, the delivery address region 41 is initially blank. Only after the digital media has been inserted in the mailer, the delivery address region is filled in with a customer delivery address. Return address 42 and postage markings 44 may be pre-printed, but may also be printed after the mailer is filled. Top sheet 40 also includes an opening 43 to allow scanning of information on the middle sheet 20.

Figure 5A:
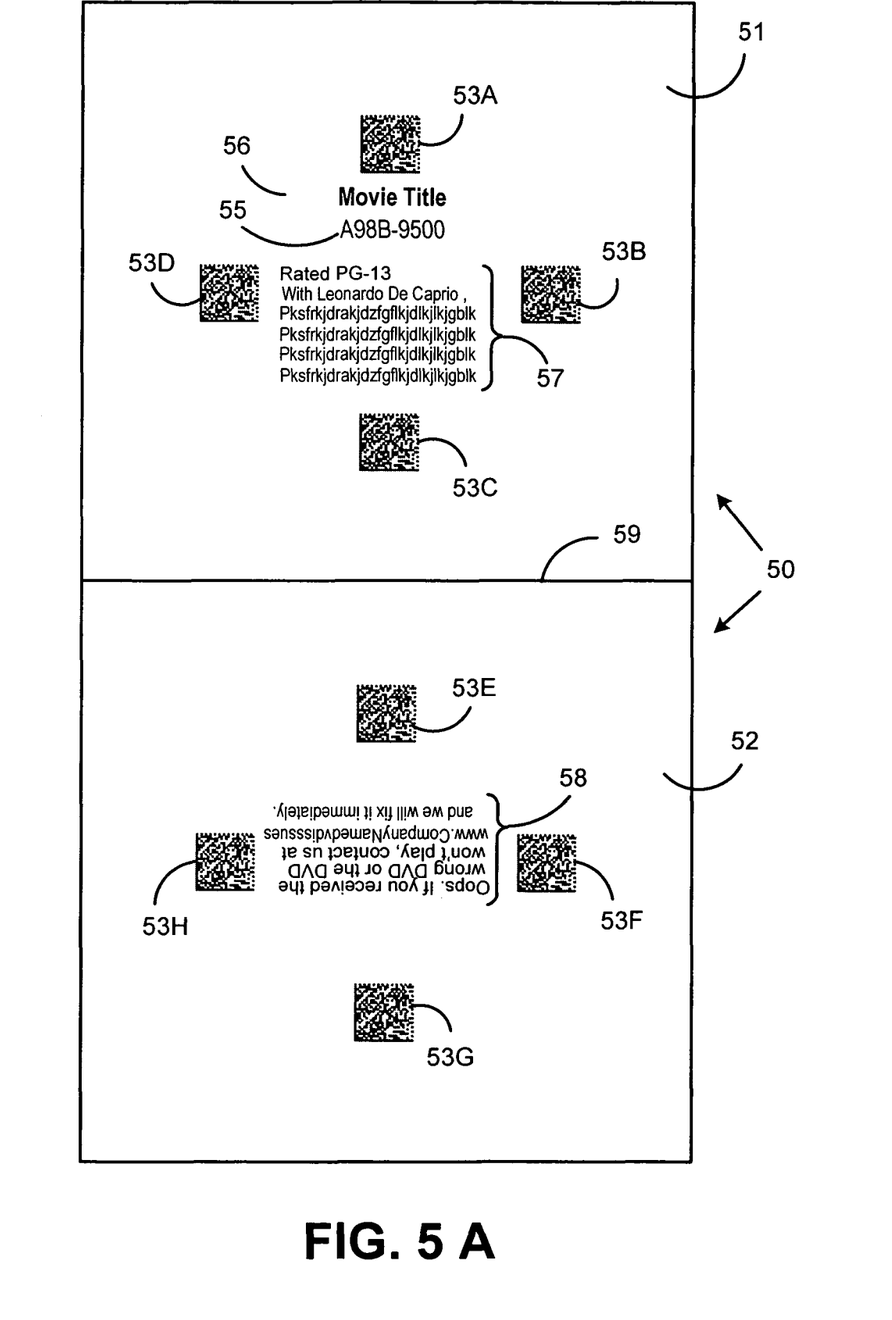
FIGS. 5A and 5B depict exemplary fronts and backs of sleeves for holding digital media disks.
Figure 5B:
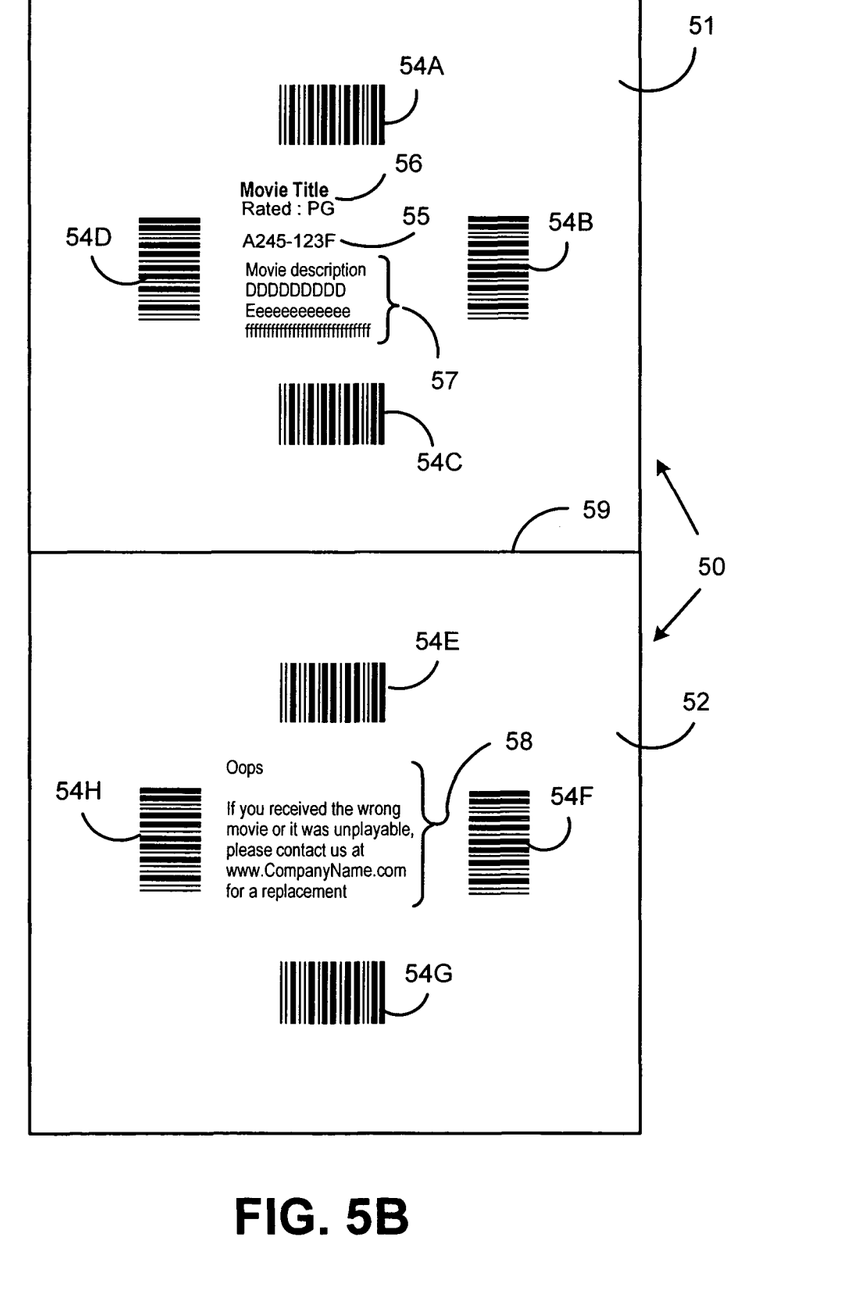

FIGS. 5A and 5B depict embodiments of a digital media sleeve 50 having a front face 51 and a back face 52. In these examples, the sleeve is comprised of a single sheet separated by a folding line 59. It will be understood that any configuration of sleeve will suffice, so long as it fits in the pocket region 18.

An important feature of the sleeve 50 in FIG. 5A is that 2-D barcodes 53A-H are evenly space at a radial distance around a center of the sleeve. Barcodes 53A-H is preferably ½ inch square.

These barcodes 53A-H includes an identification of the content of the digital media contained in the sleeve 50, for example the DVD movie title, or a serial number for a particular copy of the DVD. Such information may also be included in supplementary 1-D barcode 54 or plain text code 55. The sleeve 50 further preferably includes a plain text title 56 for the media content, along with detailed descriptions 57 and instruction messages 58.

By positioning the four barcodes 53A-D in a square at a predetermined distance around the center of the front face 51, and by positioning the openings 13 and 23 at the same predetermine distance, and at 90 degrees relative to the edges of the envelope, it is assured that one of the barcodes 53A-D can be positioned to be scanned through openings 13 and 23 for outgoing and incoming pieces, without opening the mailer. With this arrangement, one of the barcodes 53A-H will be visible through the openings 13 and 23 regardless of the orientation in which the customer places the DVD sleeve 50 into the envelope.

As a result, more streamlined processes may be applied by a rental service for incoming mail whereby time critical DVD's can be identified sooner, without the need to open the pieces. Also, for outgoing pieces, automated processes for inserting and addressing DVD's can be controlled by scanning of at least one of the sleeve barcodes 53A-H. Similarly, FIG. 5B depicts an embodiment where one dimensional barcodes 54A-H are used instead of 2D barcodes.

Figure 8A:
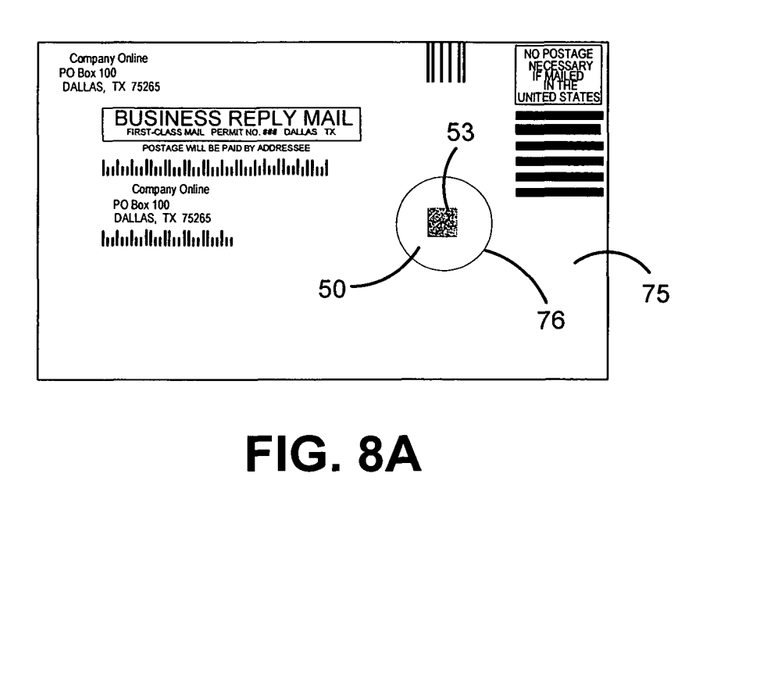
FIGS. 8A and 8B depict an exemplary return portion of the mailer with the digital media sleeve enclosed.
Figure 8B:
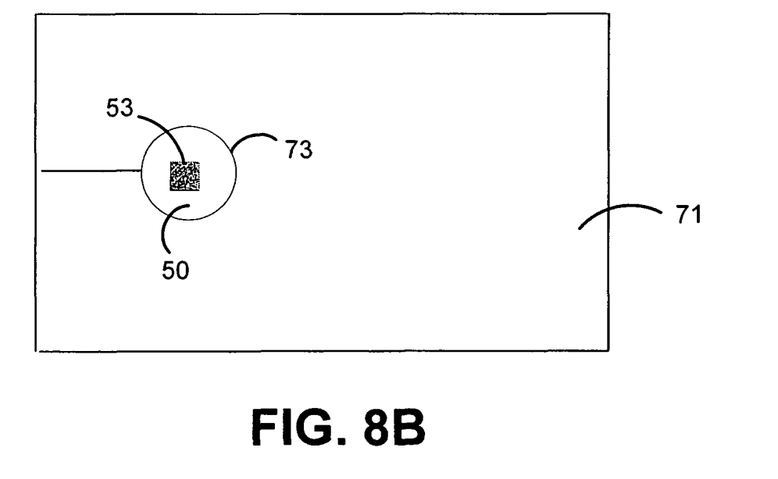

FIGS. 8A and 8B show an exemplary return portion of a two-way mailer, with the sleeve barcode 53 showing through openings 73 and 76, offset from the center of the sleeve by 90 degrees and at the predetermined distance from the center.

It should be understood the requirement of placing the barcode 53, or openings 13 and 23, in their respective positions on the sleeve 50 or pocket region 18 does not require a strict geometric measurement. Rather, the size of the openings 13 and 23 and a smaller size of the barcode 53 may allow for a margin of error in placement such that they may be considered centered for purposes of this invention. What matters most is that at least one of the barcodes 53A-H be visible through the openings 13 and 23, regardless of the orientation of how the sleeve 50 is placed in the pocket.

Figure 6:
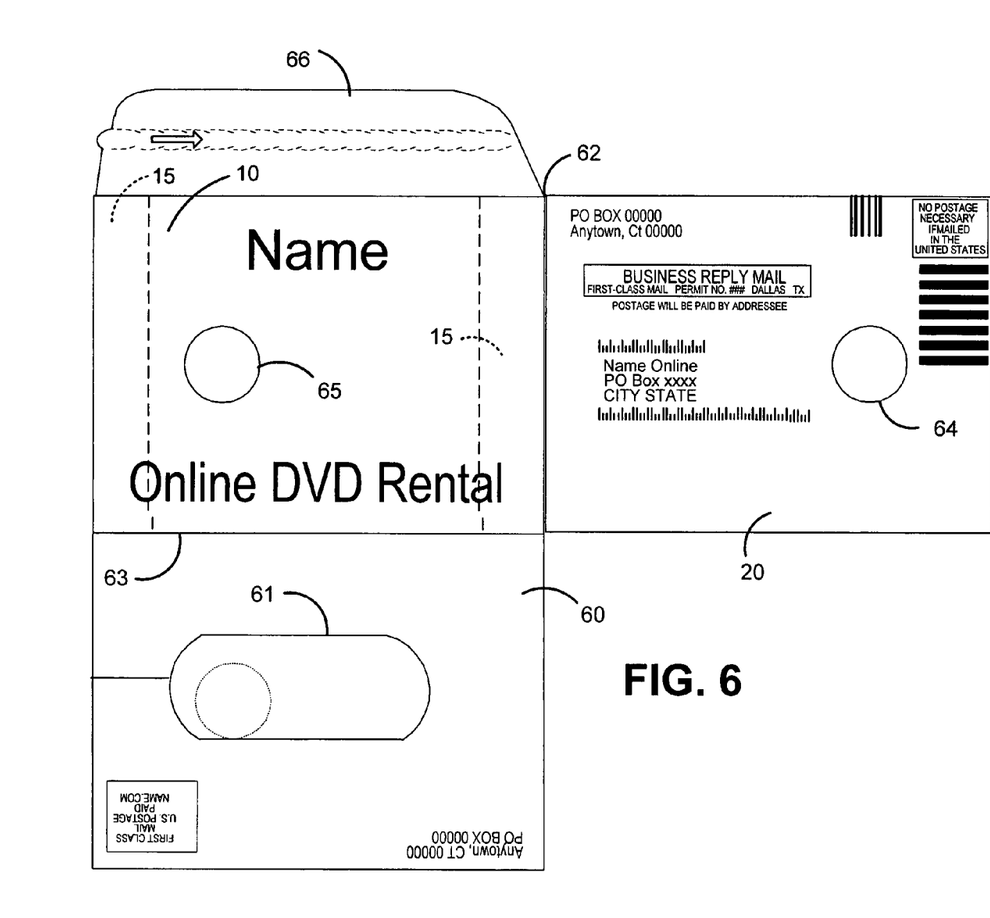
FIG. 6 depicts an alternative arrangement for forming two-way mailers.

FIG. 6 depicts an alternative embodiment for constructing the mailer, having two main differences from what was described previously. First, the sheets 10, 20 and 60 forming the mailer are formed from a single sheet. In this arrangement, middle sheet 20 would first be folded along line 62 to be fixed along the adhesive regions 15 of the back sheet 10. Then, top sheet 60 could be folded along fold line 63 to be affixed on top of the middle sheet 20. Line 63 may be perforated to facilitate removal of top sheet 60 prior to sending the return mail piece.

Alternatively, sheet 20 be switched with sheet 60, so that the top of middle sheet 20 is along fold line 63, while the edge of top sheet 60 is along fold line 62. As another acceptable variation, sheets 10 and 20 may be formed from a single sheet, while top sheet 60 is formed from a separate sheet.

The other structural difference depicted in FIG. 6 is the placement of opening 61. Top sheet opening 61, when folded over middle sheet 20 allows access to the opening 23 and to the return address destination region 21. By exposing the return address destination region 21, it is possible scan one of the sleeve barcodes 53 and to print a unique return address in the return address destination 21 while the mailer is being assembled, and after the media is inserted. This arrangement is discussed further below in connection with FIGS. 7A-D.

Figure 7A:
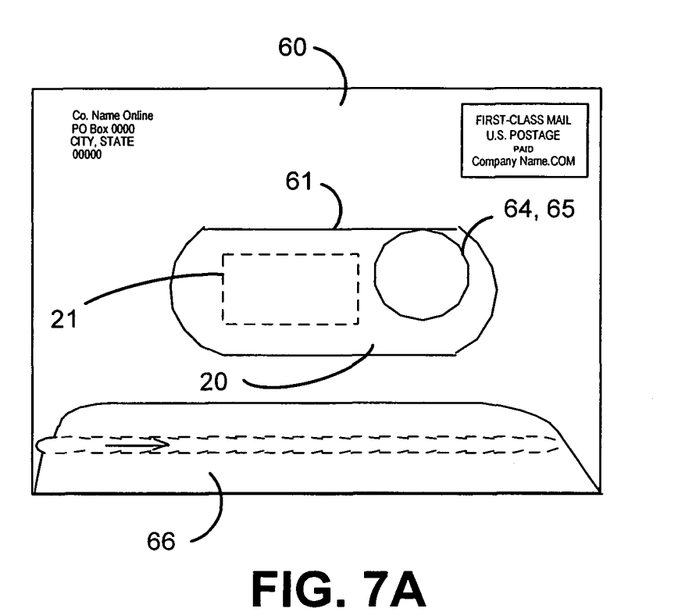
FIGS. 7A-7D depict components and finished assembly of one of the alternative arrangements.
Figure 7B:
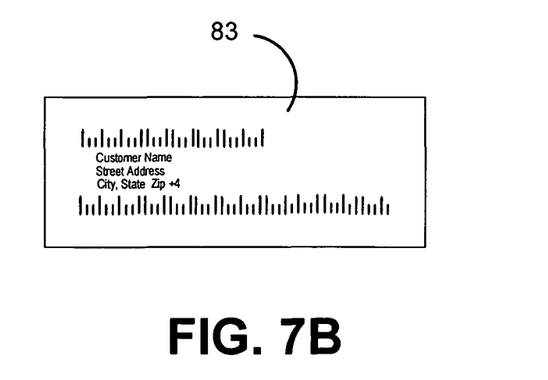
Figure 7C:
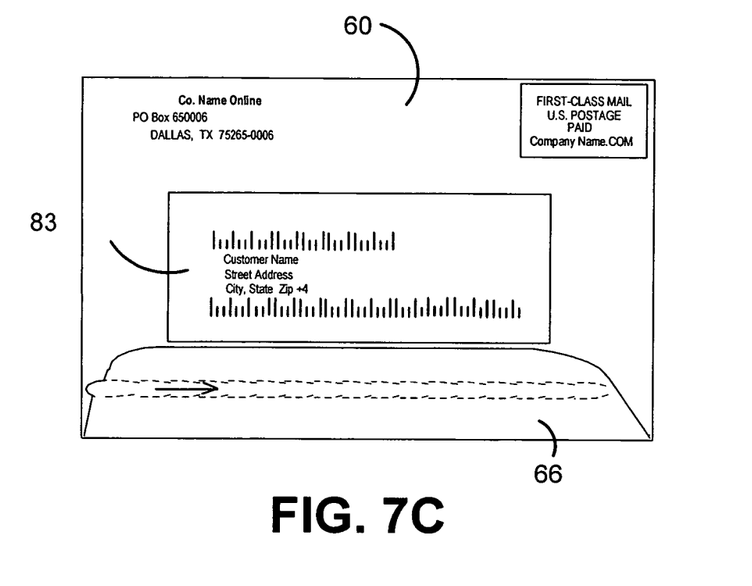

FIG. 7A depicts a partially constructed mailer similar to that shown in FIG. 7. In FIG. 7A the return delivery address region 21 has been left blank on the middle sheet 20. Also, the opening 61 has taken the place where normally an outgoing delivery address would have been printed. To finish mailer shown in this embodiment, a printer prints the return delivery address on the region 21 through the opening 61. The unique return address printed in region 21 may include Postnet and/or PLANET codes. Such codes can bye used by the Postal Service to track mail throughout delivery in the postal delivery system. Next, an outgoing delivery address is printed on a label 83 as depicted in FIG. 7B. The label 83 is then place on the top sheet 60 over the opening 61 as depicted in FIG. 7C.

Figure 7D:
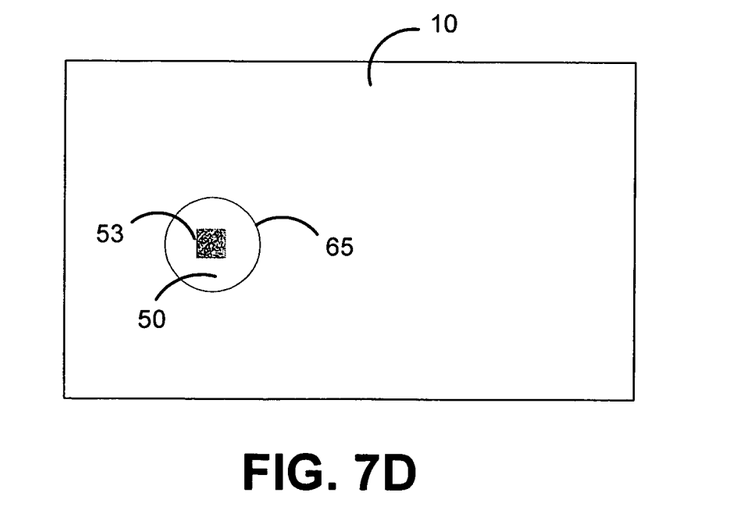

For completeness, FIG. 7D shows a rear view of the mailer with the sleeve 50 and barcode 53 showing through the opening 65.

Figure 9:
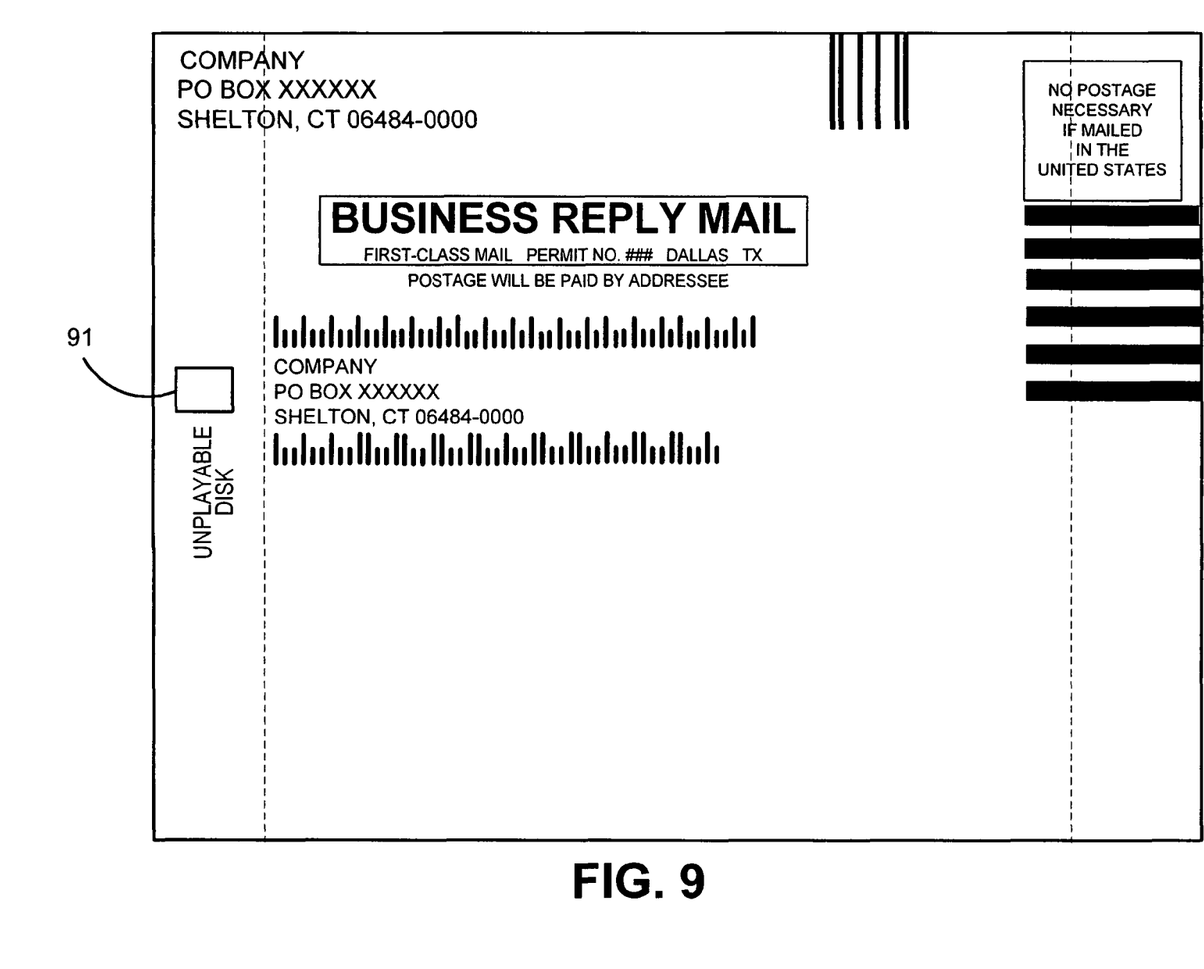
FIG. 9 depicts an embodiment with an check box for indicating a defective DVD is enclosed.

FIG. 9 depicts a preferred embodiment where the return portion of the envelope includes a box 91 for an indicator marking. If the user has a problem playing the DVD, the processing center needs to know so that corrective action can be taken. Accordingly, automated equipment scans the incoming returned mail pieces to determine whether box 91 includes an indicator mark. If a mark is present, then the automated equipment can outsort the returned piece for cleaning or repair processing.

Figure 10:
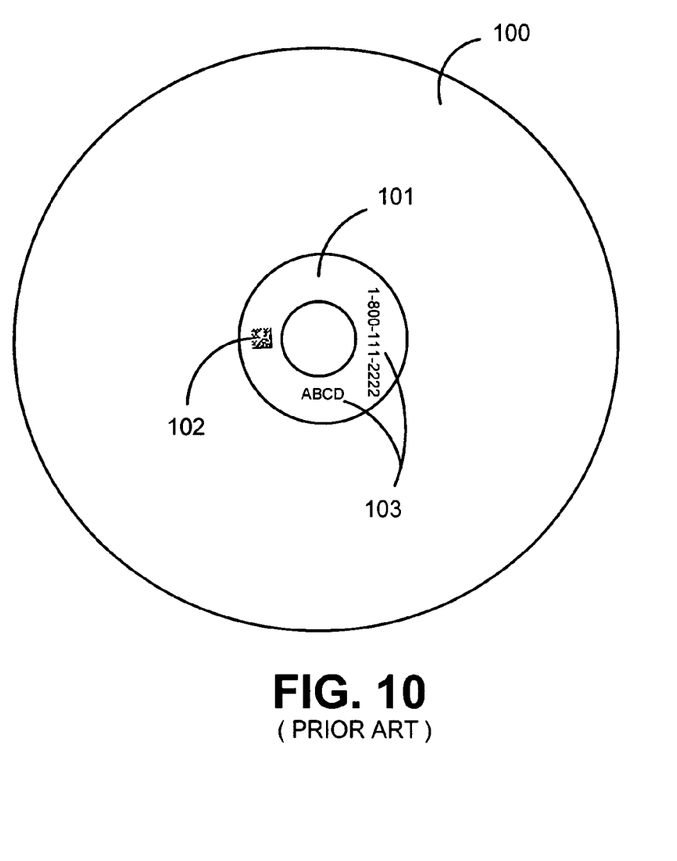
FIG. 10 depicts an exemplary known digital media disc for use in connection with the present invention.

FIG. 10 depicts an exemplary DVD 100 that is used in connection with the preferred embodiment. DVD 100 includes a hub 101 on which a barcode 102 and/or text information can be displayed. In a prior art arrangement, it is known for the hub to include a barcode 102 that includes information about the DVD 100.

Figure 11:
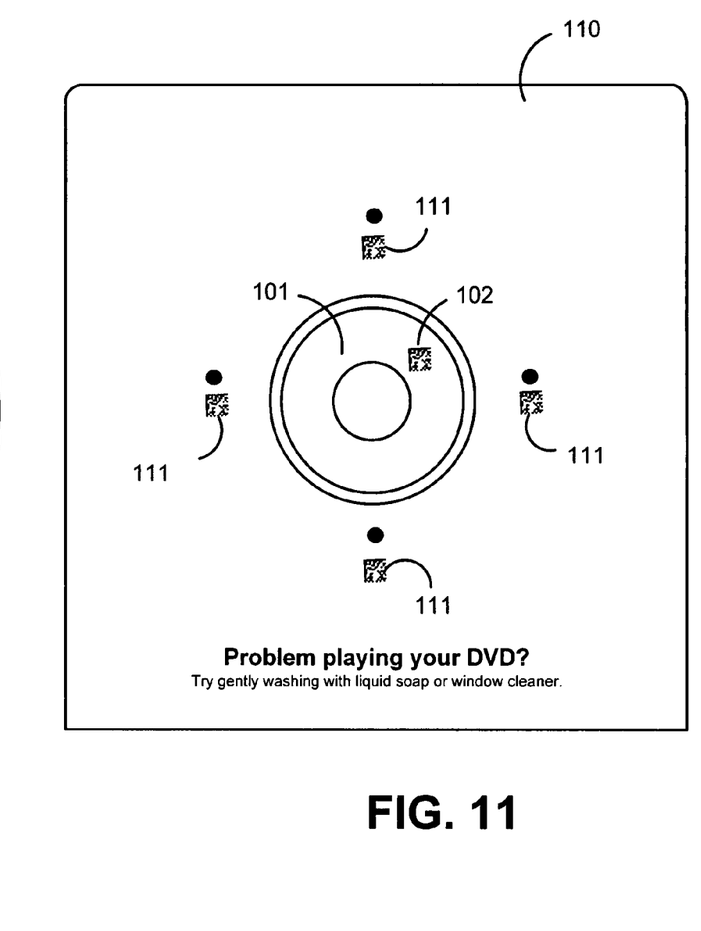
FIG. 11 depicts an embodiment of a combination of a DVD and sleeve.
Figure 12:
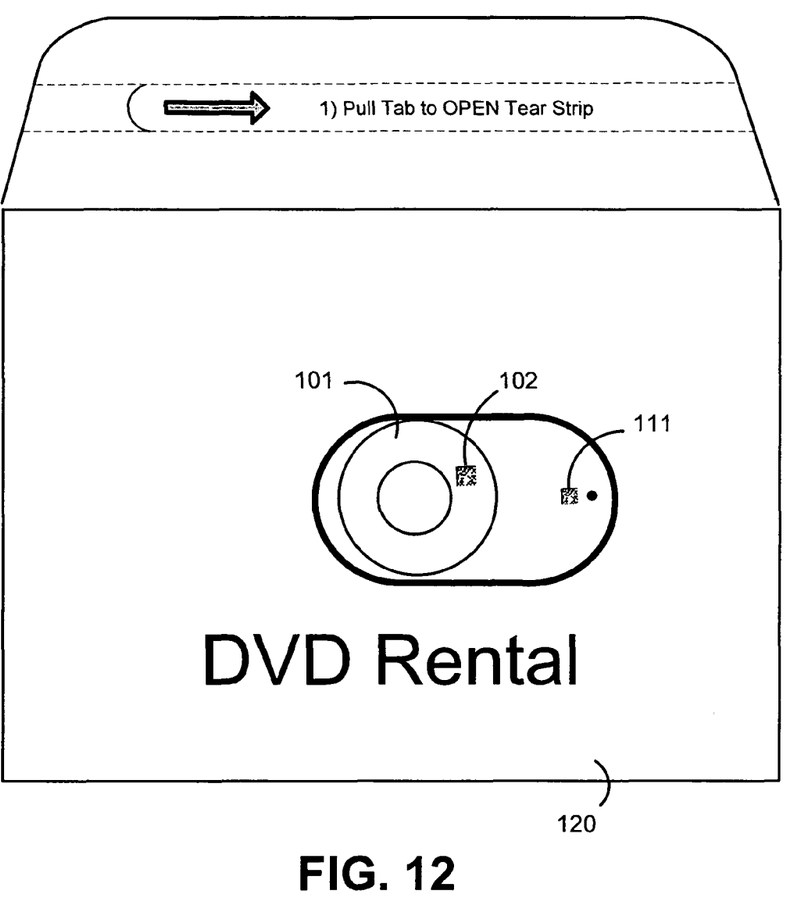
FIG. 12 depicts a view of a DVD and sleeve inside an envelope in accordance with a preferred embodiment.

The arrangement shown in FIG. 11 represents a significant improvement that provides for automated processing of returned DVD's. In this embodiment, DVD 100 is placed within a sleeve 101 having barcodes 111. The DVD barcode 102, on the hub 101 of the DVD 100, includes information identifying the DVD. Barcodes 111 also include information identifying the DVD. As a result, the barcodes 102 and 111 can be compared to determine whether the DVD 100 is matched with the correct sleeve 110 for which it is intended. Since the sleeve 110 usually includes information that is specific to that DVD 100, it is important that it be correct before being sent to another customer. By automated scanning of the barcode 102 through the opening in the sleeve, and scanning of a barcode 111 an automated comparison can be done to determine whether extra processing is required to correct a mismatch between the DVD and the sleeve. FIG. 12 depicts one exemplary way in which barcodes 102, on the DVD hub 101, and barcode 111 on the sleeve are seen through an opening in an envelope 120.

Figure 13:
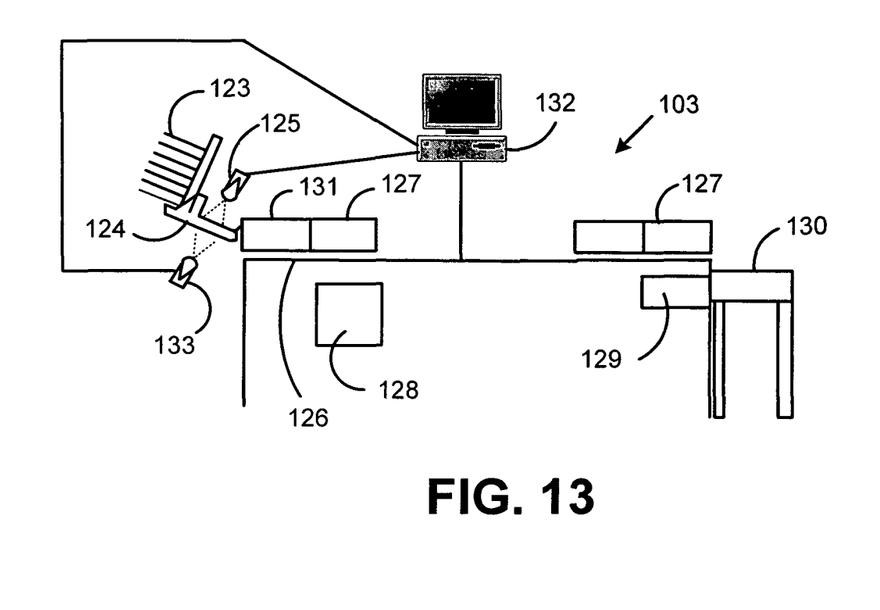
FIGS. 13 and 14 depicts an exemplary sorter machine for use with the DVD processing system.
Figure 14:
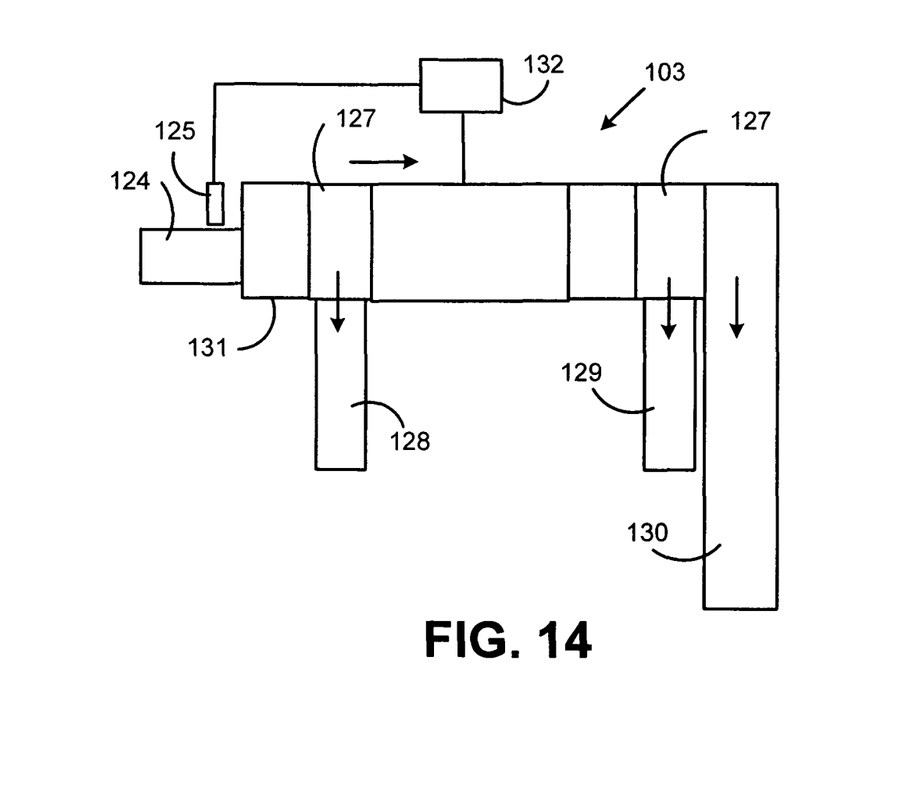

FIGS. 13 and 14 depict a side and top view of sorter machine 103. Incoming DVD envelopes 123 are placed in a feeder 124. In the preferred embodiment, then the codes on the DVD sleeves and on the DVD's themselves should be visible through windows on either side of the envelope. A scanner camera 125 scans codes from the DVD envelopes 123 as they are fed to the sorter deck 126. Envelopes 123 are then transported along the length of deck 126. In this embodiment, if the camera 125 cannot properly read the envelope, the envelope is diverted at divert module 127 into divert bin 128 or 129. Unreadable envelopes may be processed by hand, or repaired and placed back in the feeder 124. At the end of the sorter 103, a stacking device 130 is positioned to stack the processed DVD envelopes.

In operation, envelopes 123 are preferably similar to the one depicted in FIG. 12. The scanner camera 125 captures an image of the disc hub barcode 102 and sleeve barcode 111. Camera 125 is coupled to a controller computer 132. Controller computer 132 may be any kind of conventional computer capable of rapidly processing barcode images. Controller computer 132 decodes the barcodes 102 and 103 and determines whether they correspond to one another. In one embodiment, the corresponding match may be established by identifying that the two barcodes are identical to each other, the identical barcodes being associated with a particular DVD. Alternatively, the barcodes 102 and 103 might be different, but can be related to each other in a database as linked to a common DVD.

If the controller 132 determines that the sleeve barcode 111 does not match the disc hub barcode 102 then the sorter is controlled to divert the digital media package into one of the divert bins 128 or 129 that is designated for manual processing when errors such as this are detected. If a proper match is found between the barcodes 102 and 111 then the sorter may proceed with sorting the digital media to the output stacker 127.

In another embodiment, scanner camera 125 looks for a mark made by the subscriber in box 91, as seen in FIG. 9. The controller computer 132 interprets such a mark to mean that the disc is defective and requires error processing. Accordingly, controller 132 controls diverters 127 to direct the marked envelopes to bins 128 or 129 for manual error processing.

In a further embodiment, the sorter 103 detects whether there are more or less than a single disk in the mail packages 123. A first technique comprises including scanning a third code on an opposite side of the disc hub through the sleeve opening via a second scanner camera 133, positioned opposite scanner 125. Controller computer 132 is coupled to the second camera 133. Controller computer 132 compares the third code the first and/or second codes to determine if the codes on both sides belong to the same DVD. If they are different, then controller 132 determines that there is more than one DVD in the sleeve. If no first or third barcode is detected, the controller 132 determines there is no disc in the sleeve. In either event, where there is more or less than one disc in a sleeve, then controller 132 outsorts the digital media package to one of the error processing bins 128 or 129.

In another embodiment, a thickness sensor 127 coupled to controller 132 is used to determine whether the thickness of the mailed digital media package is too much or too little for a single disc. If it is too much, then it may be inferred that there is more than one disc. If there is too little thickness, then it means that there is no disc in the sleeve. In either event, where there is more or less than one disc in a sleeve, then controller 132 outsorts the digital media package to one of the error processing bins 128 or 129.

Although the invention has been described with respect to preferred embodiments thereof, it will be understood by those skilled in the art that the foregoing and various other changes, omissions and deviations in the form and detail thereof may be made without departing from the spirit and scope of this invention. In particular, it should be remembered that although DVD's are described as the mailed digital media, the invention is applicable any type of flat digital media.

What is claimed is:

1. A method for automated return processing of mailed digital media, the mailed digital media comprising a disc enclosed in a sleeve, the method comprising:
    scanning a first code on a hub of the disc through a sleeve opening using a scanner;
    scanning a second code on the sleeve using the scanner;
    comparing using a controller the first and second codes to determine whether the first and second codes correspond; and
    if the first and second codes do not correspond then sorting the mailed digital media for error processing.

2. The method of claim 1 further including scanning a third code on an opposite side of the disc hub through the sleeve opening, comparing the third code to the first and second codes and determining that multiple discs are in the sleeve if the first and third codes do not match.

3. The method of claim 1 further comprising measuring a thickness of the mailed digital media to identify whether there is more or less than one disc in the sleeve, and if there is more or less than one disc, then sorting the mailed digital media for error processing.

4. The method of claim 1 wherein the step of scanning the first code results in no code being detected and further including steps of identifying that there is no disc in the sleeve, and sorting the sleeve for further error processing.

5. The method of claim 1 wherein the mailed digital media is further composed of an envelope that receives and encloses the sleeve and the step of scanning the first code is further comprised of scanning the first code through an envelope opening.

6. The method of claim 5 wherein the step of scanning the second code on the sleeve is accomplished through the same envelope opening as the scanning of the first code.

7. The method of claim 5 further comprising:
    creating the sleeve with dimensions to enclose the disk, the sleeve including a plurality of identification markings corresponding to the first code on at least one of the sleeve's outer surfaces, the identification markings each positioned at a first radial distance from a center of the sleeve in regularly angled intervals around the center of the sleeve; and
    creating the envelope to include a sleeve pocket, the sleeve pocket including the envelope opening on at least one side of the envelope, the envelope opening being open at substantially the first radial distance from a center of the sleeve pocket, and at a same angle as the identification markings, such that any of the identification markings will show through the envelope opening when the sleeve is placed in the sleeve pocket in any of its possible orientations.

8. The method of claim 7 further comprising:
    instructing the user to place the digital media in the sleeve and the sleeve in the envelope to form a stuffed envelope; and
    receiving the stuffed envelope.

9. The method of claim 5 further including a step of scanning for an unplayable indicator mark made by sender on the envelope, and if an unplayable indicator mark is detected then identifying the disc as requiring correction processing, and sorting the mailed digital media for further processing.

10. A digital media mail piece arranged for automated return processing comprising:
    a digital media disc, the disc having a hub on which a first code is printed;
    a sleeve dimensioned to receive the disc and having an opening positioned to reveal at least a portion of the disc hub with the first code, the sleeve having a second code on at least one of the surfaces, and
    wherein the first and second code are indicative of whether the sleeve and the disc correspond to one another.

11. The digital media mail piece of claim 10 wherein the first code is printed on both sides of the disc hub.

12. The digital media mail piece of claim 10 further comprising an envelope that receives and encloses the sleeve, the envelope having at least one envelope opening positioned for viewing of the first and second codes on the disc hub and the sleeve.

13. The digital media mail piece of claim 12 wherein the same envelope opening is arranged to provide a view of the second code on the sleeve and the first code on the disc hub.

14. The digital media mail piece of claim of claim 12 wherein the sleeve includes a plurality of identification markings corresponding the second code on at least one of the sleeve's outer surfaces, the identification markings each positioned at a first radial distance from a center of the sleeve in regularly angled intervals around the center of the sleeve; and
    the envelope includes a sleeve pocket, the sleeve pocket including an opening on at least one side of the envelope, the opening located at substantially the first radial distance from a center of the sleeve pocket, and at a same angle as the identification markings, such that any of the identification markings will show through the opening when the sleeve is placed in the sleeve pocket in any of its possible orientations.

15. The digital media mail piece of claim of claim 12 further including an indicator marking on the envelope which is marked to identify the disc as requiring correction processing.

* * * * *